though of course it is also possible to utilize reflux temperatures at superatmospheric pressures, said temperature ranging from about ambient up to about 200° C. or more, the particular temperature which is used being dependent upon the type of polybasic acid which is being purified. Upon completion of the desired residence time the reaction mixture is recovered from the reaction vessel and treated by conventional means which may include filtration to separate the unreacted acid from the substituted urea which contains the undesired impurities. Following this the polybasic acid is washed with an organic solvent such as diethyl ether, methyl ethyl ether, dipropyl ether or with an alcohol such as methyl alcohol, ethyl alcohol, n-propyl alcohol, isopropyl alcohol, etc. to remove any of the substituted urea which is still retained on the polybasic acid, and thereafter dried and recovered.

United States Patent Office 3,746,755
Patented July 17, 1973

3,746,755
PURIFICATION OF POLYBASIC ACIDS
Stephen N. Massie, Palatine, Ill., assignor to Universal Oil Products Company, Des Plaines, Ill.
No Drawing. Filed Jan. 25, 1971, Ser. No. 109,604
Int. Cl. C07c 51/42, 55/20
U.S. Cl. 260—525                                    9 Claims

ABSTRACT OF THE DISCLOSURE

Polybasic acids which contain impurities which are present due to the method of manufacturing said acids are removed by treating a polybasic acid with a substituted urea.

---

This invention relates to a process for the purification of polybasic acids, and more specifically to a method for the removal of impurities from polybasic acids utilizing certain substituted urea of the type hereinafter set forth in greater detail.

Due to the increased usage of synthetic fibers in commercial articles of manufacture such as clothing, window drapes, window curtains, or other types of synthetic cloths, it is necessary to prepare starting materials for these synthetic fibers which are relatively pure in nature and will not contain undesirable contaminants. As an example of this, polybasic aromatic acids such as terephthalic acid or isophthalic acid, which are utilized as one of the starting materials in the manufacture of synthetic fibers, are usually prepared in a commercial manner by the oxidation of the corresponding alkylbenzenes utilizing a variety of techniques. Likewise, relative long aliphatic dicarboxylic acids such as sebacic acid or decamethylene dicarboxylic acid may also contain impurities arising from their specific mode of preparation. These polybasic acids, due to the particular method of manufacture thereof, are often contaminated with undesirable quantities of partially oxidized materials such as the corresponding acid-aldehydes, acid-alcohols, polyhydroxides, etc. These contaminants will also impart undesirable characteristics to the finished product, said characteristics including color, or color development. Therefore, due to the level of these colored or colorable materials, the polybasic acid is unaccepted for use in the manufacture of synthetic fibers such as nylon, Dacron, Mylar, and Terylene.

It is therefore necessary to purify the polybasic acids by removing the aforesaid impurities prior to the use in the preparation of these acids in the manufacture of certain fibers. It has now been discovered that the polybasic acids may be treated with substituted ureas whereby the undesirable impurities are removed while leaving the bulk of the acids undissolved, thereby permitting the recovery of the purified polybasic acid in a commercially acceptable form.

It is therefore an object of this invention to provide a process for the purification of polybasic acids.

A further object of this invention is to subject a polybasic acid to treatment with a substituted urea whereby any impurities therein are effectively removed therefrom.

In one aspect an embodiment of this invention resides in a process for the purification of a polybasic acid which comprises treating said acid with a substituted urea at treating conditions and recovering the resultant purified polybasic acid.

A specific embodiment of this invention is found in the process for the purification of a polybasic acid which comprises treating terephthalic acid with tetramethylurea at a temperature in the range of from ambient to about 200° C. and a pressure in the range of from atmospheric to about 100 atmospheres, and recovering the resultant purified terephthalic acid.

Other objects and embodiments will be in the following further detailed description of the present invention.

As hereinbefore set forth the present invention is concerned with the process for the purification of polybasic acids by treating said acids with a substituted urea at treating conditions. The treating conditions which are employed in the process of this invention will include temperatures in the range of from ambient (about 24° C.) up to about 200° C. or more and at pressure ranging from atmospheric up to about 100 atmospheres or more, the desired operating pressures being that which is required to maintain a major portion of the substituted urea in the liquid phase and are afforded by the introduction of a substantially inert gas such as nitrogen into the purification apparatus. It is also contemplated within the scope of this invention that additional solvents other than the substituted ureas may be employed, said solvents including the alcohols such as methyl alcohol, ethyl alcohol, n-propyl alcohol, isopropyl alcohol, n-butyl alcohol, t-butyl alcohol, etc., ethers such as dimethyl ether, diethyl ether, dipropyl ether, methyl ethyl ether, methyl propyl ether, etc., aromatic hydrocarbons such as benzene, toluene, xylene, etc., or chlorinated hydrocarbons such as chlorobenzene, o-dichlorobenzene, trichloroethylene, etc.

Examples of polybasic acids which contain impurities due to the method of manufacture thereof which may be subjected to the purification process of the present invention will include both polybasic acids and polybasic aromatic acids. Some specific examples of these acids which may undergo purification will include dibasic aliphatic acids such as succinic acid, glutaric acid, adipic acid, pimelic acid, suberic acid, azelaic acid, sebacic acid, nonamethylene dicarboxylic acid, decamethylene dicarboxylic acid, undecamethylene dicarboxylic acid, dodecamethylene dicarboxylic acid, tridecamethylene dicarboxylic acid, etc.; polybasic aromatic acids will include phthalic acid, isophthalic acid, terephthalic acid, trimellitic acid, trimesic acid, hemimellitic acid, pyromellitic acid, mellophanic acid, prehnitic acid, 1,2-naphthalene dicarboxylic acid, 1,4-naphthalene dicarboxylic acid, 1,2,3-naphthalene tricarboxylic acid, 1,2,4-naphthalene tricarboxylic acid, etc. It is to be understood that the aforementioned polybasic acids, both aromatic and aliphatic in configuration are only representative of the class of compounds which may be purified, and the present invention is not necessarily limited thereto.

Substituted ureas which may be employed to effect the purification of polybasic acids by acting as solvents for the impurities contained therein will include di- and tetra-substituted ureas such as N,N'-dimethyl urea, N,N'-diethyl urea, N,N'-dipropyl urea, N,N'-diisopropyl urea, N,N'-di-n-butyl urea, tetramethyl urea, tetraethyl urea, tetra-n-propyl urea, tetra-isopropyl urea, tetra-n-butyl urea, tetra-t-butyl urea, etc.

The process of this invention may be effected in any suitable manner and may comprise either a batch or continuous type operation. For example, when a batch type operation is to be employed, a quantity of the polybasic acid containing undesirable impurities is placed in an appropriate treating vessel. This vessel may comprise a flask provided with stirring, heating, and refluxing means, or if in the event superatmospheric pressures are to be employed in the process, an autoclave of the rotating or mixing type. The substituted urea is also placed in the treating vessel in an amount in the range of from about 10% to about 300% by weight of the acid which is to be treated. Thereafter, the treating vessel is heated to the desired temperature and maintained thereat for a predetermined residence time which may range from 0.25 up to about 20 hours or more in duration. In the event that the treating is effected at atmospheric pressure, it is possible to operate the reaction at the reflux temperature of the particular substituted urea which is employed as the treating agent. Upon completion of the desired residence time, the polybasic acid is separated from the solvent containing the dissolved impurities, washed, dried, and recovered. The solvent may then be purified by distillation and reused.

It is also contemplated within the scope of this invention that the purification of the polybasic acid may be effected in continuous manner of operation the purification step being employed as an integral part of the basic preparation step and may be inserted in any convenient portion of the overall preparation reaction. For example, it may be inserted at a point directly after preparation of the desired acid or at a point after the acid has been converted to the desired form such as flaking, pelleting, etc. When utilizing a continuous manner of operation, the polybasic acid containing the contaminants is continuously charged to the purification zone which is maintained at the proper operating conditions of temperature and pressure. In addition, the particular substituted urea which acts as the treating agent or purifying agent is also continuously charged to the purification zone. After treatment for a predetermined residence time, the purified polybasic acid is recovered and separated from the solvent, the latter being continuously charged to the distillation unit whereby the impurities are removed therefrom and the purified solvent then recycled to the reaction zone.

The following examples are given to illustrate the process of the present invention which, however, are not intended to limit the generally broad scope of the present invention in strict accordance therewith.

EXAMPLE I

In this example, a 10 g. portion of terephthalic acid containing impurities comprising a mixture of the corresponding acid-aldehydes and acid-alcohols is treated with 5 g. of tetramethyl urea. The mixture is admixed by shaking for a period of 0.5 hour at 85° C. At the end of the aforementioned time period, the solid terephthalic acid is separated from the tetramethyl urea which contains the dissolved acid-aldehydes and acid-alcohols contaminants. The purified terephthalic acid is washed, dried and recovered while the solvent containing the impurities is subjected to fractional distillation whereby the purified tetramethyl urea is recovered for further use.

EXAMPLE II

In this example, a 10 g. portion of trimellitic acid containing a mixture of impurities comprising the corresponding acid-aldehydes and acid-alcohols which constitute partially oxidized material is treated with 10 g. of tetraethyl urea for a period of 24 hours, said treatment taking place at ambient temperature and atmospheric pressure. At the end of the aforementioned time period, the reaction mixture is recovered and the purified trimellitic acid is separated from the solvent by means of filtration. The contaminated tetraethyl urea is subjected to fractional distillation to remove the impurities and permit the recovery of the purified tetramethyl urea which is tetramethyl urea which is thereafter utilized for more purification.

EXAMPLE III

A mixture of 20 g. of sebacic acid and 15 g. of tetramethyl urea is placed in an extraction vessel and thoroughly admixed for a period of 12 hours. At the end of this time, the sebacic acid is separated from the tetramethyl urea by filtration, washed, dried and recovered. The solvent which contains the dissolved impurities comprising the mixture of the corresponding acid-aldehydes and acid-alcohols is then subjected to distillation to remove said impurities, thereby permitting the further use of the solvent in subsequent purification steps.

EXAMPLE IV

A mixture of 20 g. of isophthalic acid and 15 g. of tetramethyl urea is placed in a reaction vessel fitted with a refluxing apparatus. The mixture is then heated to a temperature of 178° C. and maintained thereat for a period of 0.25 hour. At the end of the aforementioned time period, heating is discontinued and the purified isophthalic acid is separated from the contaminated tetramethylurea and recovered.

EXAMPLE V

A mixture comprising 25 g. of decamethylene dicarboxylic acid which is contaminated by the presence of partially oxidized material comprising the corresponding acid-aldehydes or acid-alcohols along with dihydroxy compounds is treated with 20 g. of tetrapropyl urea, said reaction being effected at a temperature of 90° C. for a period of 8 hours. At the end of the desired residence time, heating is discontinued and the reaction mixture allowed to return to room temperature. The purified decamethylene dicarboxylic acid is separated from the contaminated tetrapropyl urea by filtration, washed, dried, and recovered. Thereafter the contaminated tetrapropyl urea is subjected to distillation, thus permitting the recovery of purified tetrapropyl urea for further use as a solvent in subsequent purification reactions.

I claim as my invention:

1. A process for the purification of a polybasic acid containing partially oxidized materials selected from the group consisting of the corresponding acid-aldehydes, acid-alcohols and polyhydroxides which comprises treating said acid with a di- or tetra-alkyl substituted urea at a temperature in the range of from ambient to about 200° C. and a pressure in the range of from atmospheric to about 100 atmospheres and recovering the resultant purified polybasic acid.

2. The process as set forth in claim 1 in which said substituted urea is tetramethylurea.

3. The process as set forth in claim 1 in which said substituted urea is tetraethylurea.

4. The process as set forth in claim 1 in which said substituted urea is tetrapropylurea.

5. The process as set forth in claim 1 in which said polybasic acid is trimellitic acid.

6. The process as set forth in claim 1 in which said polybasic acid is sebacic acid.

7. The process as set forth in claim 1 in which said polybasic acid is terephthalic acid.

8. The process as set forth in claim 1 in which said polybasic acid is isophthalic acid.

9. The process as set forth in claim 1 in which said polybasic acid is decamethylene dicarboxylic acid.

References Cited

UNITED STATES PATENTS 3,637,761   1/1972   Kuwata et al. ‎‎‎‎‎‎‎ 260—525

LORRAINE A. WEINBERGER, Primary Examiner

R. S. WEISSBERG, Assistant Examiner

U.S. Cl. X.R.

260—537 R